United States Patent
Czerwinski et al.

(10) Patent No.: US 7,913,183 B2
(45) Date of Patent: Mar. 22, 2011

(54) SYSTEM AND METHOD FOR MANAGING SOFTWARE APPLICATIONS IN A GRAPHICAL USER INTERFACE

(75) Inventors: Mary Czerwinski, Woodinville, WA (US); Greg Smith, Bellevue, WA (US); Brian Meyers, Bellevue, WA (US); Patrick Markus Baudisch, Seattle, WA (US); George G. Robertson, Seattle, WA (US); Daniel C. Robbins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1040 days.

(21) Appl. No.: 10/679,796

(22) Filed: Oct. 6, 2003

(65) Prior Publication Data
US 2004/0066414 A1 Apr. 8, 2004

Related U.S. Application Data

(60) Provisional application No. 60/417,066, filed on Oct. 8, 2002, provisional application No. 60/450,588, filed on Feb. 26, 2003, provisional application No. 60/472,511, filed on May 22, 2003.

(51) Int. Cl.
*G06F 3/048* (2006.01)
*G06F 3/01* (2006.01)
(52) U.S. Cl. ........ 715/779; 715/771; 715/788; 715/811; 715/835
(58) Field of Classification Search .................. 715/771, 715/764, 788, 810, 835, 840, 838, 792, 779, 715/766–768, 781
See application file for complete search history.

(56) References Cited

U.S. PATENT DOCUMENTS

| 5,305,435 | A | * | 4/1994 | Bronson | 715/777 |
| 5,694,561 | A |   | 12/1997 | Malamud et al. | |
| 5,790,120 | A | * | 8/1998 | Lozares et al. | 715/779 |
| 6,005,579 | A | * | 12/1999 | Sugiyama et al. | 715/855 |
| 6,404,443 | B1 | * | 6/2002 | Westerman | 715/776 |
| 6,544,295 | B1 | * | 4/2003 | Bodnar | 709/219 |
| 6,717,596 | B1 | * | 4/2004 | Nason et al. | 715/788 |
| 6,756,999 | B2 | * | 6/2004 | Stoakley et al. | 715/779 |
| 6,931,412 | B2 |   | 8/2005 | Uyttendaele et al. | |
| 7,010,755 | B2 | * | 3/2006 | Anderson et al. | 715/778 |
| 7,051,276 | B1 |   | 5/2006 | Mogilevsky et al. | |
| 7,124,373 | B1 | * | 10/2006 | Patil | 715/779 |

(Continued)

FOREIGN PATENT DOCUMENTS

DE 36 18 256.7 A1 12/1987

(Continued)

OTHER PUBLICATIONS

Kirk Hiner, DragThing v4.3, Jun. 14, 2002 (Apple) http://www.applelinks.com/reviews/dragthing-v4.shtml.*

(Continued)

*Primary Examiner* — Weilun Lo
*Assistant Examiner* — Nicholas Augustine
(74) *Attorney, Agent, or Firm* — Lee & Hayes, PLLC

(57) ABSTRACT

A system and method for managing software application windows in a graphical user interface having a desktop and taskbar display area are provided. Each instantiated program is represented as one or more graphical windows in the desktop and as a control tile in the taskbar. Control tiles are grouped into control tile groups that facilitate organization and single access control. Project control tile groups allow the grouping of multiple software applications. Additionally, minimized control tile group layout and state may be preserved and previewed prior to being restored.

91 Claims, 11 Drawing Sheets

U.S. PATENT DOCUMENTS

| | | | |
|---|---|---|---|
| 7,181,697 B2* | 2/2007 | Tai et al. | 715/779 |
| 7,308,449 B2 | 12/2007 | Fairweather | |
| 2001/0035882 A1 | 11/2001 | Stoakley et al. | |
| 2003/0126139 A1 | 7/2003 | Lee et al. | |
| 2004/0066414 A1 | 4/2004 | Smith et al. | |
| 2006/0115822 A1 | 6/2006 | Webb et al. | |
| 2006/0277499 A1 | 12/2006 | Britt et al. | |
| 2007/0016607 A1 | 1/2007 | Yu et al. | |

FOREIGN PATENT DOCUMENTS

| | | |
|---|---|---|
| DE | 3618256.7 | 12/1987 |
| FR | 2 693 810 A1 | 1/1994 |
| FR | 2693810 | 1/1994 |

OTHER PUBLICATIONS

James Thomson, DragThing v4.3 Apr. 19, 2002 (DT1) http://web.archive.org/web/20020524155927/http://www.dragthing.com/.*

James Thomson, DragThing version history v4.3 and below pp. 4-20, Apr. 9, 2002 (DT2) http://web.archive.org/web/20020409150945/www.dragthing.com/english/history.html.*

Wikipedia.org; http://en.wikipedia.org/wiki/Sorting_algorithm.*

Angelo, M., "The Linux (Multiple) Virtual Desktops Unleashed—Part I: Overview," *MozillaQuest.com*, May 7, 2004, p. 1, <http://www.mozillaquest.com/Linux4Windows/Linux4Windows08/Linux4Windows_04_08_Story-01.html> [retrieved Jul. 19, 2006], 20 pages.

Angelo, M., "The Linux (Multiple) Virtual Desktops Unleashed—Part I: Overview," *MozillaQuest.com*, May 7, 2004, p. 2, <http://www.mozillaquest.com/Linux4Windows/Linux4Windows08/Linux4Windows_04_08_Story-02.html> [retrieved Jul. 19, 2006], 19 pages.

Dances With Crows, "Re: How Do I Configure X to be One Screen/One Window (Like Window$) with Window$ Look and Feel?" Sep. 23, 2002, Online Newsgroup: comp.os.linux.x, <http://groups.google.de/group/compos.linux.x/msg/4a405e4fa65bc94b?dmode=source&h1=fr&output=gplain> [retrieved Aug. 21, 2006], 3 pages.

Nation, R., "Fvwm Version 1.21c X-11 Window Manager is Available," Mar. 10, 1994, Online Newsgroup: comp.windows.x.i386unix/msg/7855f990bc68302?dmode=source&h1=fr&output=gplain> [retrieved Jul. 20, 2006], 2 pages.

Ceri, et al. Web Modeling Language (WebML): a modeling language for designing web sites, Jun. 2000, Computer Networks, vol. 33, Issues 1-6, pp. 137-157.

Keme et al. A recombinant Informatioin Space, Sep. 2003, University of Teeside(UK), School of Computing and Mathematics, Virtual Environment Group, pp. 1-10.

Prescod, et al. Addressing the Enterprise: Why the Web needs Grooves, ISOGEN Consulting Engineer http://xml.coverpages.org/prescodGroves199606.html, pp. 1-16.

Czerwinski, et al. Interruptions and Task Switching: From Diary Study to Design, Submitted to Human-Computer Interaction—Interact '03, Stolus, M. (Ed.), IOS Press, pp. *-*. Copyright IFIP, 2003, Zurich, Switzerland.

M. Angelo, "The Linux (Multiple) Virtual Desktops Unleashed—Part I: Overview," MozillaQuest.com, May 7, 2004, p. 1, http://www.mozillaquest.com/Linux4Windows/Linux4Windows08/Linux4Windows_04_08_Story-01.html. Retrieved Jul. 19,2006, 20 pgs.

M. Angelo, "The Linux (Multiple) Virtual Desktops Unleashed—Part I: Overview," MozillaQuest.com, May 7, 2004, p. 2, http://www.mozillaquest.com/Linux4Windows/Linux4Windows08/Linux4Windows_04_08_Story-01.html. Retrieved Jul. 19, 2006, 19 pgs.

Dances With Crows, "Re: How Do I Configure X to be One Screen/One Window (Like Window$) with Window$ Look and Feel?" Sep. 23, 2002, Online Newsgroup: conp.os.linus.x, http://groups.gogle.de/group/compos.linux.x/msg/4a405e4fa65bc94b?dmode=source&h1=fr&output=gplain. Retrieved Aug. 21, 2006, 3 pgs.

R. Nation, "Fvwm Version 1.21c X-11 Window Manager is Available," Mar. 10, 1994, Online Newsgroup: comp.windows.x.i386unix, http://groups.google.de/group/comp.windows.x.i386unix/msg/7855f990bc68302? dmode=source&h1=fr&output=gplain. Retrieved Jul. 20, 2006, 2 pgs.

James Thomson, DragThing v4.3 Apr. 19, 2002 (DT1) http://web.archive.org/web20020524155927/http://www.dragthing.com/.

James Thomson, DragThing versino history v4.3 and below pp. 4-20, Apr. 9, 2002 (DT2) http://web.archive.org/web/20020409150945/www.dragthing.com/english/history.html.

JP OA dated Sep. 19, 2008 for JP Application Serial No. 2003-350054, pp. 37.

* cited by examiner

SYSTEM AND METHOD FOR MANAGING SOFTWARE APPLICATIONS IN A GRAPHICAL USER INTERFACE

CROSS-REFERENCES TO RELATED APPLICATIONS

This application claims the benefit of U.S. Provisional Application No. 60/417,066, entitled PROJECT ORGANIZATION USER INTERFACE, filed on Oct. 8, 2002, U.S. Provisional Application No. 60/450,588, entitled WINDOWS GROUP ORGANIZATION USER INTERFACE, filed on Feb. 26, 2003, and U.S. Provisional Application No. 60/472,511, entitled SMARTCUTS AND THE CASE FOR PRESERVING WINDOW STATE, filed May 22, 2003. U.S. Provisional Application Nos. 60/417,066, 60/450,588, and 60/472,511 are hereby incorporated by reference.

FIELD OF THE INVENTION

Generally, the present application relates to computer software, and in particular, to a system and method for managing the control and display of software application windows in a graphical user environment.

BACKGROUND OF THE INVENTION

Generally described, users can utilize computers for a variety of purposes. In a typical computing environment, a user can access a variety of software application programs ("applications" or "programs") to address a specific task and/or fulfill a particular goal. For example, an accountant might make regular and extensive use of a word processing program, an e-mail program, a spreadsheet program, and a personal information manager. In a graphical operating system environment, users can instantiate multiple programs at the same time, such that each program is represented as one or more graphical windows on the display area. For example, a computer may instantiate a word processing program and a spreadsheet program at the same time. Additionally, each program can in turn generate a graphical window for each file (e.g., document or spreadsheet) opened by a user.

Rather than having all the instantiated program windows present on the same part of a display screen, users can adjust the location of the graphical windows on the display area. For example, users can alter the locations of the graphical windows such that portions of multiple graphical windows are visible to the user at the same time. However, adjusting the location of graphical windows, especially across multiple monitors or large displays, can become difficult and time consuming as the number of open graphical windows increases and the number of possible configurations for the open graphical windows also increases. For example, a user may wish to view multiple graphical windows corresponding to spreadsheets and word processing while using the computer for business activities. Likewise, the same user may wish to view multiple graphical windows corresponding to Internet Web page browsers and e-mail communication tools for personal activities.

Some operating environments allow users to customize program layout that keeps a program at a particular location when it is instantiated. Such customization allows users to reduce constant arrangement of program windows. However, this approach does not provide advanced program location management that would allow programs to be grouped and managed. Other operating environments allow windows to be organized into "virtual desktops" that can be stored, recalled or otherwise manipulated. However, the virtual desktop approach requires windows to be strictly partitioned so that only a single pre-defined set of graphical window layouts is readily accessible at one time. Because the number of uses for a computer by a single user may change or because multiple users may be associated with a single computer, the single set virtual desktop approach can become inefficient.

Therefore, a need exists for a new and improved method for assisting users in maintaining arrangements of program windows in a large desktop environment in a way that improves the accessibility of programs relevant to a user's needs.

SUMMARY OF THE INVENTION

A system and method for managing software applications in a graphical user interface having a desktop and taskbar display area are provided. Each instantiated program is represented as one or more graphical windows in the desktop and as a control tile in the taskbar. Control tiles are grouped into control tile groups that facilitate organization and single access control. Project control tile groups allow the grouping of multiple software applications. Additionally, minimized control tile group layout and state may be preserved and previewed prior to being restored.

In accordance with an aspect of the present invention, a method for managing two software application windows is provided. The method may be implemented in a computer system including a display and at least two software applications windows. The software application windows are represented as graphical windows in a first portion of the display and as graphic controls on a second portion of the display when the software applications are instantiated on the computer system. In accordance with the method, an operating environment obtains an indication to organize a first graphic control corresponding to a first software application and a second graphic control corresponding to a second software application. The operating environment groups the first and second graphic controls on the second portion of the display. Additionally, the operating environment displays the first and second graphic controls as a group within the second portion of the display.

In accordance with another aspect of the present invention, a method for managing a plurality of software applications is provided. The method may be implemented in a computer system including a display and a plurality of software applications. The display includes a desktop for displaying graphical windows and taskbar for controlling the software applications. The plurality of software applications are represented as graphical windows on a desktop portion of the display and as control tiles on a taskbar portion of the display when instantiated on the computer system. In accordance with the method, an operating environment obtains an indication to group a first control tile corresponding to a first software application and a second control tile corresponding to a second software application. The operating environment groups the first and second control tiles on the portion of the display. Additionally, the operating environment displays the first and second control tiles as a group within the taskbar portion of the display.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Generally described, the present invention relates to managing graphical windows corresponding to instantiated software applications in a graphical user interface. More specifically, the present invention relates to managing graphical windows by grouping the graphical windows and iconic representations of the graphical windows in a variety of embodiments. Although the present invention may be described with regard to illustrative graphical user interfaces, one skilled in the relevant art will appreciate that these embodiments are only illustrative in nature and should not be construed as limiting. Prior to discussing the present invention in greater detail, a suitable computing system for implementing the present invention will be described.

Figure 10:
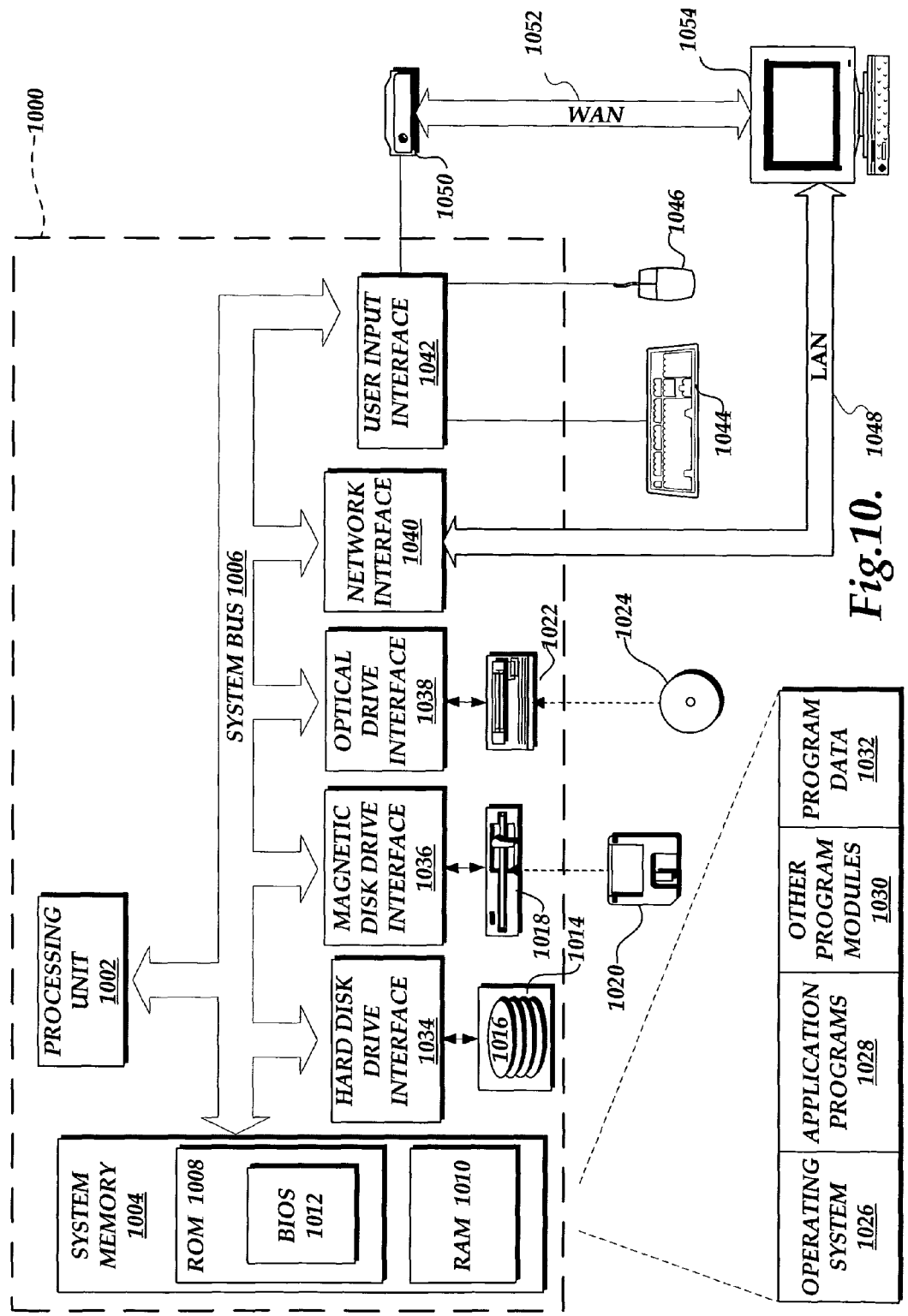
FIG. 10 is a block diagram of a computing environment suitable for implementing aspects of the present invention.

FIG. 10 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependent requirement relating to any one or combination of components illustrated in the exemplary operating environment.

The invention is operational in numerous other general purpose or special computing system environments or configurations. Examples of well known computing systems, environments, and/or configurations that may be suitable for implementing the invention include, but are not limited to, personal computers, server computers, laptop devices, multiprocessor systems, microprocessor-based systems, network PCs, minicomputers, mainframe computers, or distributed computing environments that include any of the above systems or the like.

The invention may be described in the general context of computer-executable instructions, such as program modules, being executed by a computer. Generally, program modules include routines, programs, objects, components, data structures, etc., that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the invention includes a general purpose computing device in the form of a computer 1000. Components of a computer 1000 include, but are not limited to, a processing unit 1002, a system memory 1004, and a system bus 1006 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 1000 typically includes a variety of computer-readable media. Computer-readable media can be any available media that can be accessed by the computer 1000 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 1000.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 1004 includes computer storage media in the form of volatile and/or non-volatile memory such as read only memory (ROM) 1008 and random access memory (RAM) 1010. A basic input/output system 1012 (BIOS), containing the basic routines that help to transfer information between elements within the computer 1000, such as during start-up, is typically stored in ROM 1008. RAM 1010 typically contains data and/or program modules that are immediately accessible to and/or presently being operated on by the processing unit 1002. By way of example, and not limitation, FIG. 10 illustrates an operating system 1026, application programs 1028, other program modules 1030, and program data 1032.

The computer 1000 may also include removable/non-removable, volatile/non-volatile computer storage media. By way of example only, FIG. 10 illustrates a hard disk drive 1014 that reads from or writes to non-removable, non-volatile magnetic media 1016, a magnetic drive 1018 that reads from or writes to a removable, non-volatile magnetic disk 1020, and an optical disk drive 1022 that reads from or writes to a removable, non-volatile optical disk 1024, such as CD-ROM, or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 1014, magnetic disk drive 1018, and optical disk drive 1022 may be connected to the system bus 1006 by a hard disk drive interface 1034, a magnetic disk drive interface 1036, and an optical drive interface 1038, respectively. Alternatively, the hard disk drive 1014, magnetic disk drive 1018, and optical disk drive 1022 are typically connected to the system bus 1006 by a Small Computer System Interface (SCSI).

The drives and their associated computer storage media discussed above and illustrated in FIG. 10, provide storage of computer-readable instructions, data structures, program modules and other data for the computer 1000. In FIG. 10, for example, the hard disk drive 1034 is illustrated as storing the operating system 1026, application programs 1028, other programs 1030, and program data 1032. Note that these components can either be the same as or different from the operating system 1026, the other program modules 1030, and the program data 1032. A user may enter commands and information into the computer 1000 through an input device such as a keyboard 1044 and/or a pointing device 1046, commonly referred to as a mouse, track ball or touch pad. Other input devices (not shown) may include a microphone, a joystick, a game pad, a satellite dish, a scanner, or the like. These and other input devices are often connected to the processing unit 1002 through user input interface 1042 and may be connected by other interface and bus structures, such as a parallel port, game port or other universal serial bus (USB).

The computer 1000 may operate in a network environment using logical connections to one or more remote computers 1054. The remote computer 1054 may be a personal computer, a server, a router, a network PC, a peer device or other common network node, and typically includes many or all of the elements described above relative to the computer 1000, although only a memory storage device has been illustrated in FIG. 10. The logical connections depicted in FIG. 10 include a local area network (LAN) 1048 and a wide area network (WAN) 1052, but also include other networks. Such network environments are commonplace in office, enterprise-wide computer networks, Intranets, and the Internet.

When used in a LAN network environment, the computer 1000 is connected to the LAN 1048 through a network interface adapter 1040. When used in a WAN network environment, the computer typically includes a modem 1050 or other means for establishing communications over the WAN 1052, such as the Internet. The modem, which may be internal or external, may be connected to the system bus 1006 via the serial port interface or other appropriate mechanism. In a networked environment, program modules depicted relative to the computer 1000, or portions thereof, may be stored in the remote memory storage device. By way of example, and not limitation, FIG. 10 illustrates remote application programs 1028 as residing on memory device 1004. It will be appreciated that the network connections shown are exemplary and other means of establishing communication between the computers may be used. Although many other internal components of the computer 1000 are not shown, those of ordinary skill will appreciate that such components and their interconnection are well known. Accordingly, additional details concerning the internal construction of the computer 1000 need not be disclosed in connection with the present invention.

Those skilled in the art will understand that program modules such as the operating system 1026, the application programs 1028 and data 1032 are provided to the computer 1000 via one of its memory storage devices, which may include ROM 1008, RAM 1010, hard disk drive 1014, magnetic disk drive 1018, or optical disk device 1022. The hard disk drive 1014 is used to store data 1032 and the programs, including the operating system 1026 and application programs 1028.

When the computer 1000 is turned on or reset, the BIOS 1012, which is stored in ROM 1008 instructs the processing unit 1002 to load the operating system 1026 from the hard disk drive 1014 into the RAM 1010. Once the operating system 1026 is loaded into RAM 1010, the processing unit executes the operating system code and causes the visual elements associated with the user interface of the operating system to be displayed on the monitor. When a user opens an application program 1028, the program code and relevant data are read from the hard disk drive and stored in RAM 1010.

Figure 1:
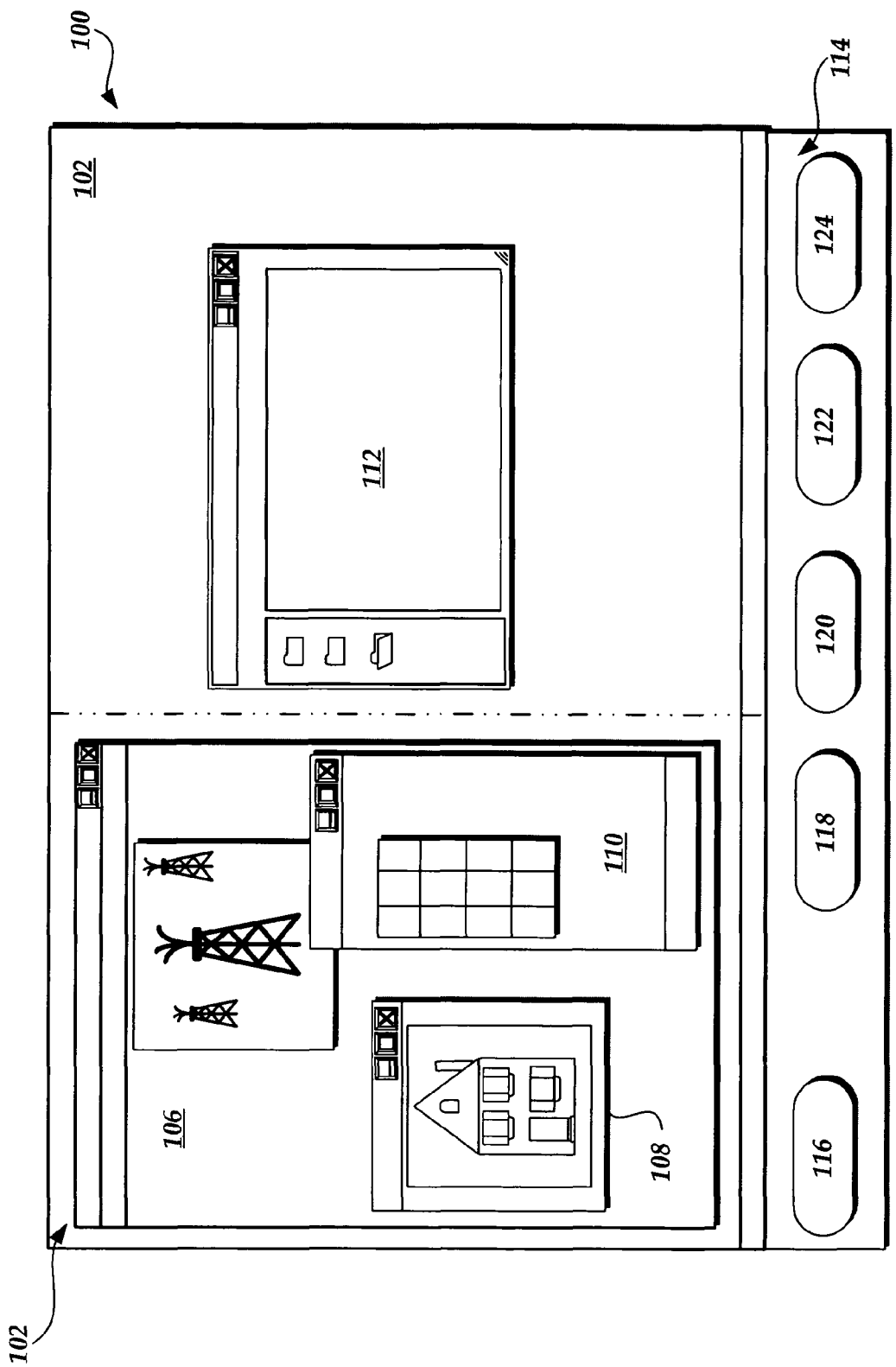
FIG. 1 is a block diagram of a graphical user interface for use with the present invention.

FIG. 1 is a block diagram of a graphical user interface 100 for use with the present invention. In an illustrative embodiment of the present invention, an operating environment being executed on a computing device generates the graphical user interface 100. The graphical user interface 100 can include a first display area 102, commonly referred to as a desktop, in which graphical windows 106, 108, 110 and 112, corresponding to instantiated programs, are displayed to the user. In an illustrative embodiment of the present invention, the desktop portion of the display may be embodied as a portion of a single display screen. Alternatively, and as illustrated in FIG. 1, the desktop portion of the display may be embodied in multiple display screens 102. The graphical user interface 100 can also include a second display area 114, commonly referred to as a taskbar, in which control tiles 118, 120, 122, and 124 corresponding to the instantiated programs are displayed to the user. The taskbar portion 114 can also include various controls 116 that can be utilized to instantiate additional programs.

In an illustrative embodiment of the present invention, each instantiated program is represented as one or more graphical windows displayed on the desktop portion 102 and as one or more control tiles displayed on the taskbar portion 114. Each graphical window displayed on the desktop portion 102 corresponds to a control tile displayed on the taskbar portion 114. As discussed above, a single program may correspond to multiple graphical windows and accordingly, multiple control tiles. The utilization of graphical windows on a desktop display to display information and/or obtaining user information and the utilization of control tiles on a taskbar display to manipulate the graphical windows or otherwise control the software programs are well known to one skilled in the relevant art and will not be described in any further detail. Additionally, although the graphical user interface 100 is illustrated with a single taskbar portion 114 located at the bottom of the display area, one skilled in the art will appreciate that graphical user interface 100 can include multiple taskbars and/or taskbars located at different location relative to the desktop portion 102.

Figure 2A:
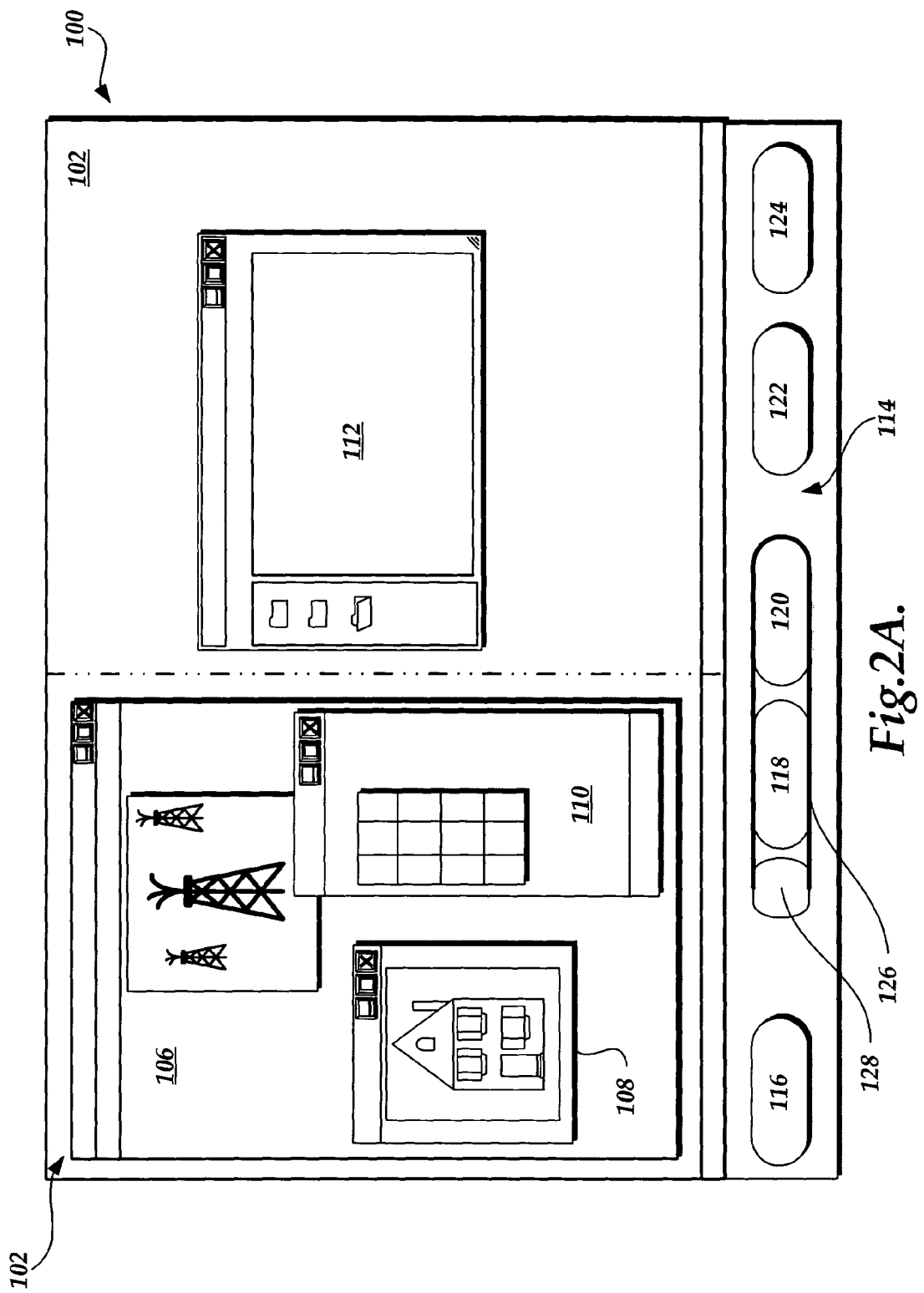
FIGS. 2A and 2B are block diagrams of the graphical user interface of FIG. 1 illustrating the grouping of multiple control tiles in accordance with the present invention.
Figure 2B:
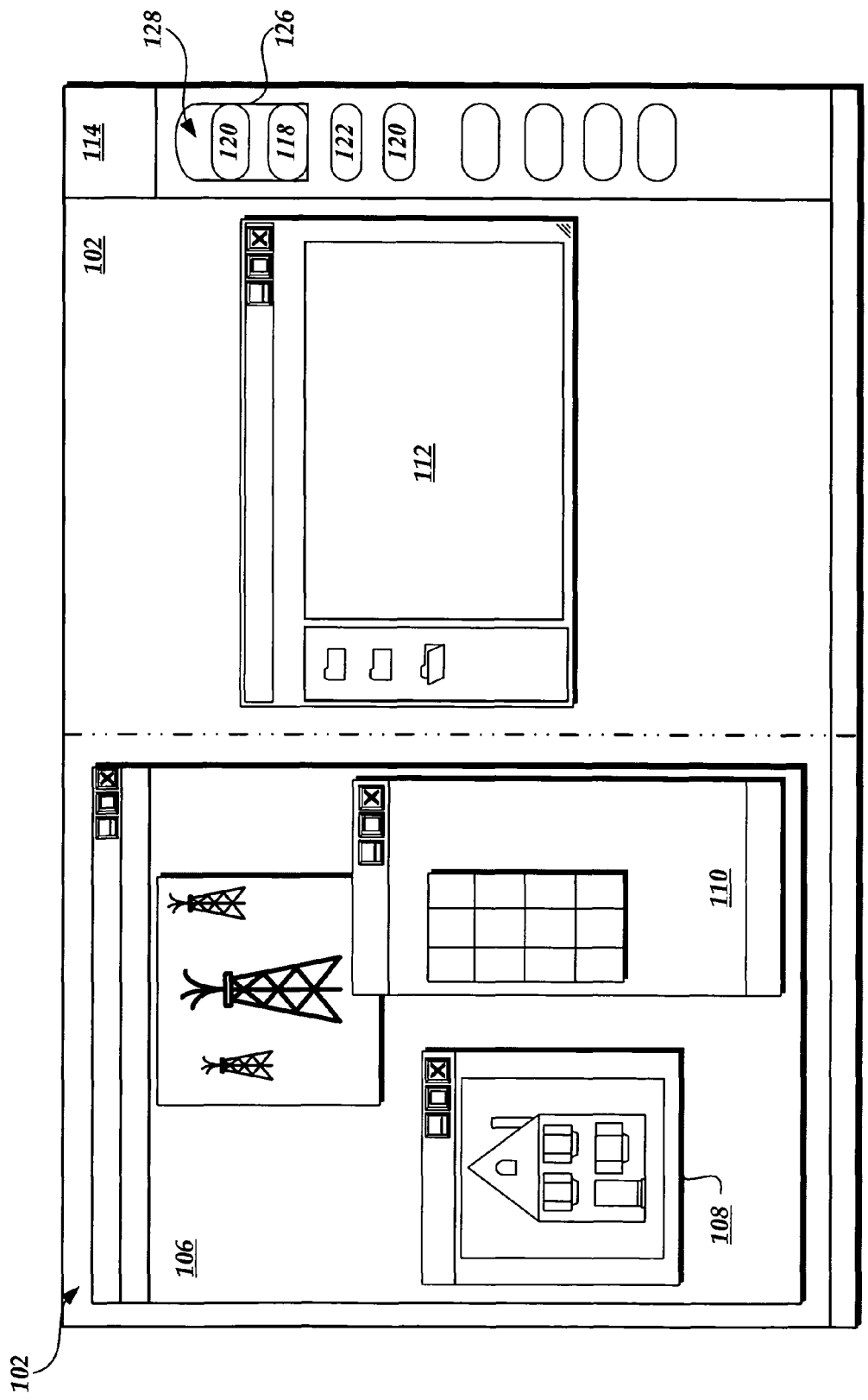

In accordance with one aspect of the present invention, control tiles corresponding to instantiated program windows may be organized within the taskbar 114 as a group. Various actions and/or functionality may be provided to the grouped program windows, as will be described in greater detail below. FIGS. 2A and 2B are block diagrams of the graphical user interface 100 of FIG. 1 illustrating the grouping of multiple control tiles. The taskbar portion 114 includes two control tiles 118, 120 that are organized to form a group 126. An indication to group control tiles may be obtained in a variety of ways. In one embodiment, users can manipulate user selection devices, such as computer mice, digitizer pens, touch screens, trackballs, keyboards and the like, to group control tiles on the taskbar 114. For example, a user can utilize traditional drag and drop functionality to select and group control tiles. Further, in another embodiment, users can be presented with a series of menus or other controls that can group control tiles on the taskbar 114. Still further, additional graphical grouping indications or gestures can be used to select and designate control tiles for grouping. For example, a user may graphically draw a circle around each control tile to be grouped. Similarly, a user may utilize selection tools, such as geometric shapes, that group any control tiles encompassed, partially or completely, by the selection tool. To facilitate the grouping of control tiles, in an illustrative embodiment of the present invention, visible, or semi-visible, taskbars may be permanently displayed at portions of the display, such as the edges of the display, that accept and retain control tile groupings. One skilled in the relevant art will appreciate that additional or alternative selection tools/methods may be incorporated into the present invention.

Figure 3:
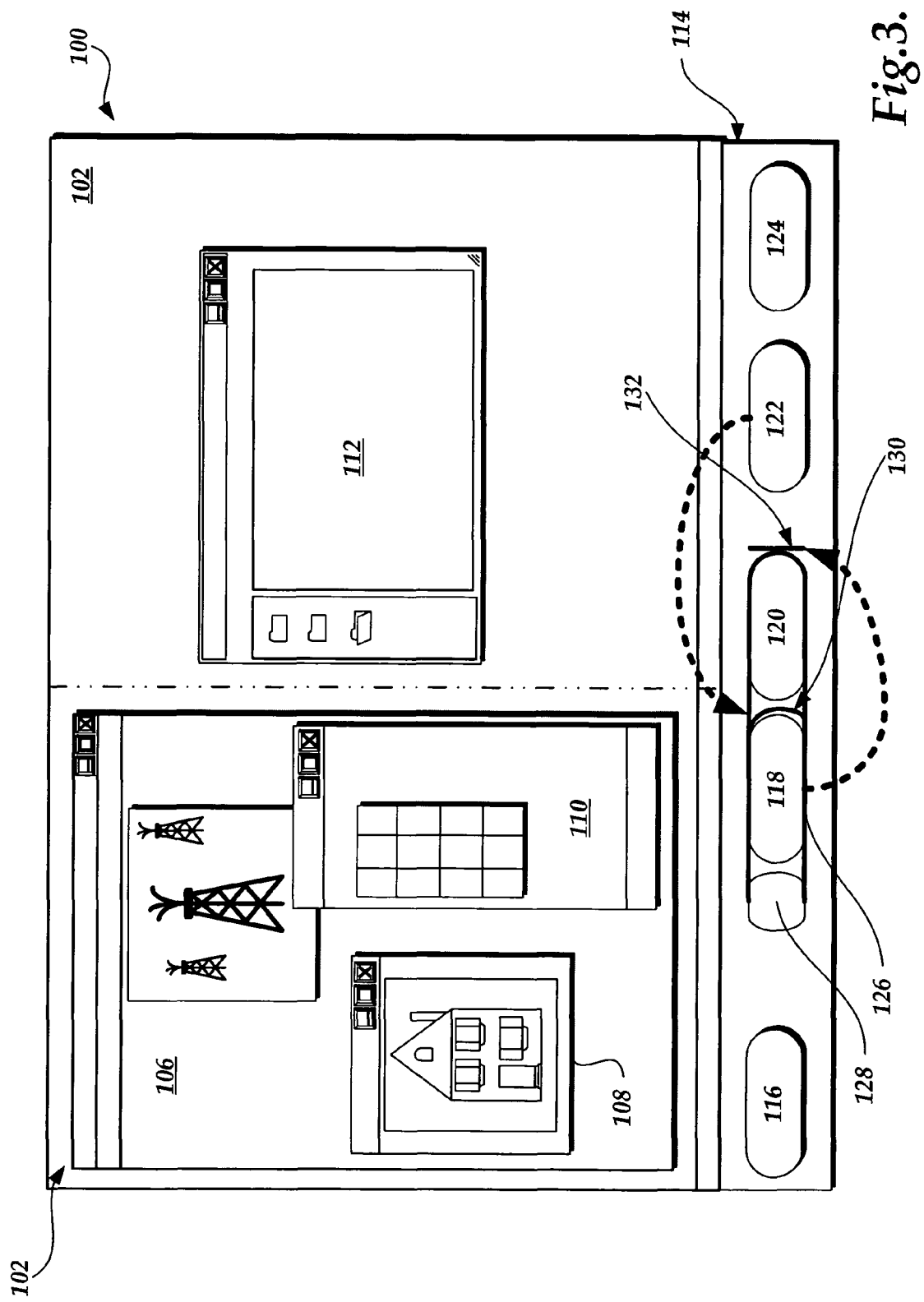
FIG. 3 is a block diagram of the graphical user interface of FIG. 2 illustrating the manipulation of control tiles utilizing drag and drop functionality in accordance with the present invention.

FIG. 3 is a block diagram of the graphical user interface 100 of FIG. 2 illustrating the manipulation of control tiles and control tile groups utilizing drag and drop functionality. In one aspect, guide sets may be displayed on the graphical user interface 100 to indicate whether a selected control tile will be included in a group of control tiles. As illustrated in FIG. 3, if a user wished to include control tile 122 into group 126, guide sets, such as curved caret 130, would indicate where a user could release the selected control tile and have it included in the group. In another aspect, the guide sets may also be used to facilitate the removal of a control tile from a group. As illustrated in FIG. 3, if a user wished to remove control tile 118 from the group 126, guide sets, such as a straight line 132, would indicate when a user could release the selected control tile such that the control tile would no longer be included in an adjacent group. One skilled in the relevant art will appreciate that additional or alternative guide sets may be utilized to facilitate user manipulation. Returning to FIG. 2A, in an illustrative embodiment of the present invention, the grouping of control tiles, such as control tiles 118, 120, can be illustrated in the graphical user interface 100 in a variety of ways. As illustrated in FIG. 2A, the grouping of control tiles 126 can include a group control tile 128 that identifies the control tile group 126. As will be explained in greater detail below, the group control tile 128 can also include additional group controls that may be applied to the control tiles 118, 120 in the control tile group 126. The group control tile 128 can include additional text and/or graphics that identify the group control tile 128 and/or the control tiles 118, 120 in the control tile group 126. For example, the group control tile 128 can include a textual and/or graphical identifier for the group. Additionally, the group control tile 128 can include an indication of the number of control tiles that are part of the particular group. Further, to identify which control tiles are included with the group, the group 126 can be displayed with a continuous border around the each of the grouped control tiles 118, 120. Additionally, the group 126 can displayed in a color schema to distinguish particular groups from the taskbar 114 or other groups. Additional techniques may be also be applied to identify particular groups, including differing display fonts, variable thickness borders, and/or adjusting the dimensions of the control tiles 118, 120. Further, as illustrated in FIG. 2B, the grouping of control tiles 118, 120 can also be achieved for embodiments in which the taskbar 114 is vertically aligned with regard to the desktop 102.

Figure 4:
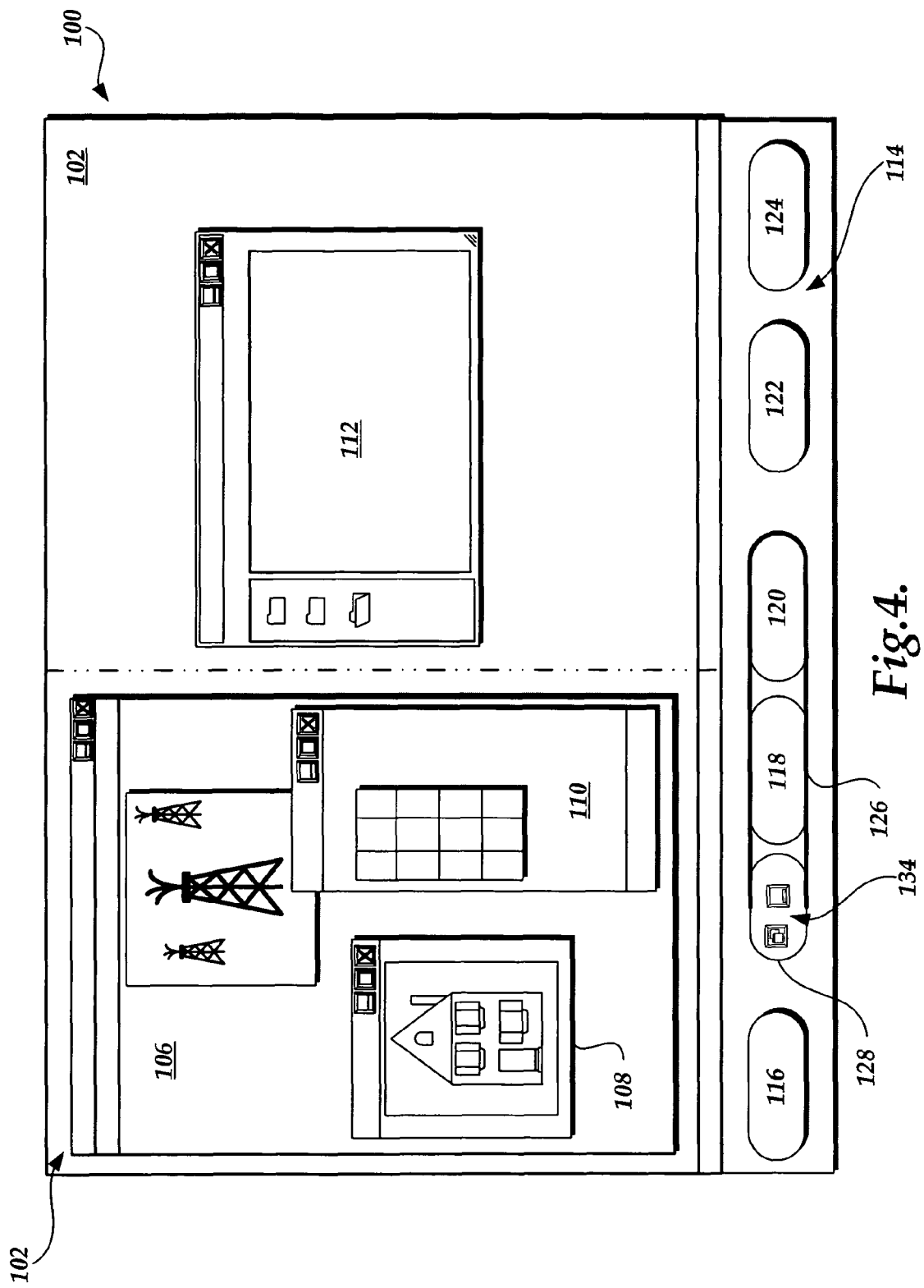
FIG. 4 is a block diagram of the graphical user interface of FIG. 2 illustrating the inclusion of group controls in a group control tile in accordance with the present invention.

With reference to now to FIG. 4 and as described above, in an illustrative embodiment of the present invention, the group control tile 128 can include one or more group controls 134. The group controls 134 can be manipulated in a manner that a selected control can be applied to each control tile 118, 120 in the control tile group 126 or a subset of tiles in the control tile group. In an illustrative embodiment of the present invention, the group controls 134 can include a control that allows users to minimize the graphical windows displayed on the desktop 102 that correspond to the control tiles in the control tile group, to restore the graphical windows displayed on the desktop 102 that correspond to the control tiles in the control tile group, to close the graphical windows displayed on the desktop 102 that correspond to the control tiles in the control tile group, to save data on applications corresponding to the graphical windows displayed on the desktop 102 that correspond to the control tiles in the control tile group, and to resize the graphical windows displayed on the desktop 102 that correspond to the control tiles in the control tile group. Additionally, in an alternative embodiment of the present invention, the group controls 134 can be manipulated in a manner such that the graphical windows of the group may be automatically arranged into one of a number of pre-defined layouts such as cascading, tiled, single window centralized, equal division of the open windows, and the like. Still further, the group controls 134 can also be utilized in a multi-modal embodiment in which the location of open graphical windows from one group can be toggled with the minimized graphical windows of another group. This allows a single user action to accomplish the task of maximizing, minimizing, and restoring many individual windows simultaneously, which would otherwise be possible with a long sequence of individual user actions. One skilled in the relevant art will appreciate that any subset of the above-mentioned controls may be included with the group controls 134 and that additional or alternative controls may also be included within the group controls.

Figure 5:
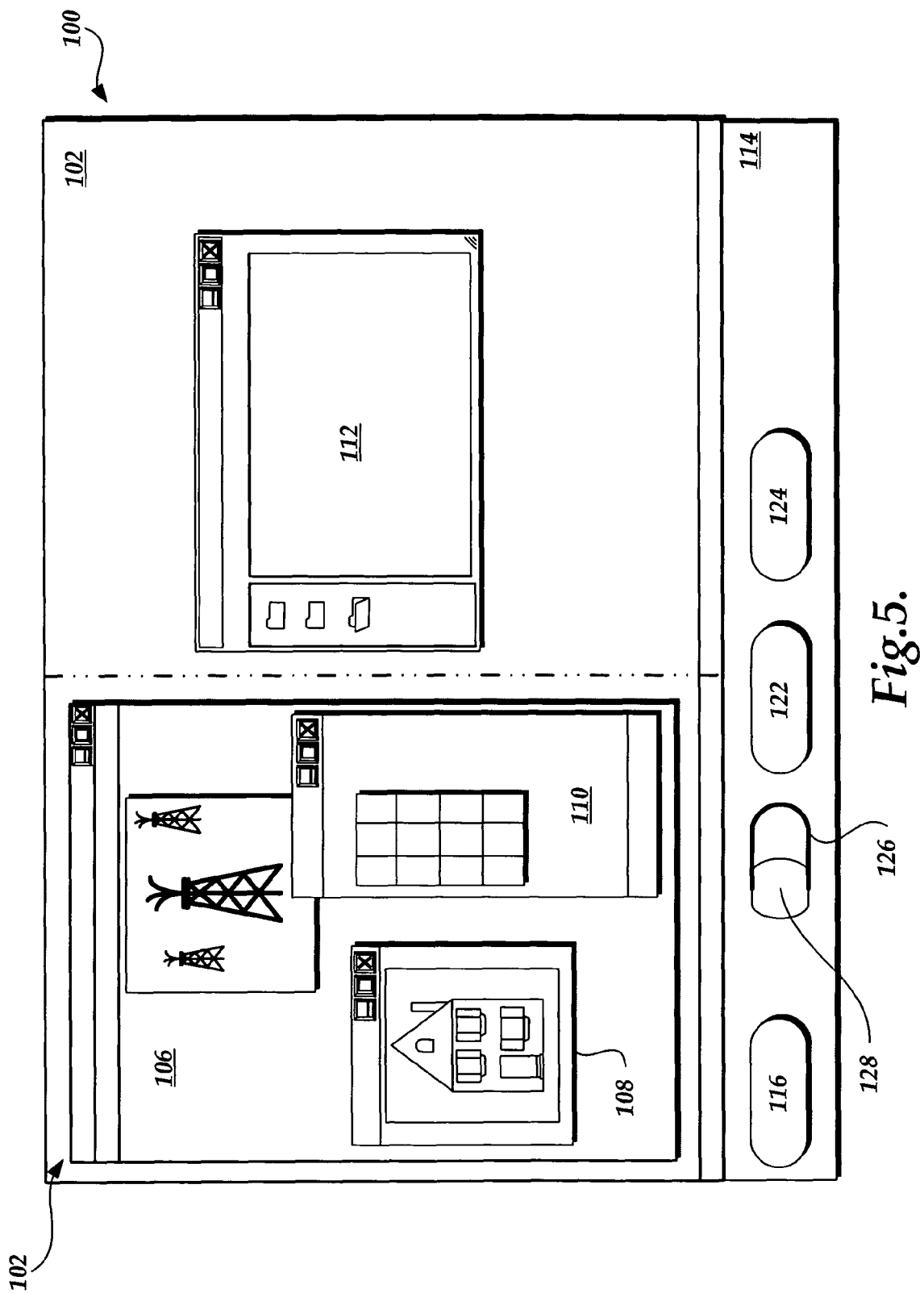
FIG. 5 is a block diagram of the graphical user interface of FIG. 2 illustrating the collapsing of a control tile group in accordance with the present invention.

Although the control tile group 126 has been illustrated in FIGS. 2-4 as including the display of at least a portion of the control tiles 118, 120 included in the group, in an illustrative embodiment of the present invention, the control tile group 126 may be represented solely by the group control tile 128. The transition of the display of the control tile group 126 from displaying a portion of the control tiles to solely displaying the group control tile 128 will be referred to as collapsing the control tile group. FIG. 5 is a block diagram of the graphical user interface 100 of FIG. 2 illustrating the collapsing of a control tile group in accordance with the present invention. Collapsing a control tile group serves the purpose of making more space available on the display surface, reducing the visual clutter presented to the user, and potentially offering a visual representation of the group that is more readily identifiable to the user. In an illustrative embodiment of the present invention, a control tile group can be collapsed based upon receiving an indication from a user to collapse the group. For example, the group control tile 128 can include a group control 134 (FIG. 4) that allows the user to manually collapse and restore the group. Further, a control tile group may be collapsed automatically by an operating environment and/or program. In one embodiment, the control tile groups 126 may be collapsed based on the available display space on the taskbar 114. If the display space normally utilized to represent the control tiles and control tile groups on the taskbar 114 exceeds the amount of space available, the operating environment may automatically collapse one or more of the control tile groups. Additionally, the operating environment may also utilize additional heuristics to select specific control tile groups 126 to collapse. For example, the operating environment may monitor a frequency of access for the control tiles with each control tile group and collapse the control tile groups that are below a access threshold or collapse the control tile groups that have been accessed the least. Additionally, the operating environment can also utilize additional criteria, such as collapsing priorities set by users or application programs, to determine which control tile groups to collapse.

In another embodiment of the present invention, the control tile group 126 may also be represented in a collapsed manner as an embedded thumbnail image on the taskbar 114. The embedded thumbnail image may correspond to an illustration, or preview, of the display of the graphical windows included within the group. Additionally, in one embodiment of the present invention, selecting the thumbnail or hovering over the thumbnail with a user selection device, results in the projection of a preview of the display of the windows with the group. In an illustrative embodiment of the present invention, the preview is a semi-translucent image displayed on the current desktop 102 and blended with currently displayed objects. Alternatively, the preview may be an opaque image that is displayed over any existing display objects. Selection of the thumbnail image 136 would result in the restoration of the graphical windows on the desktop and/or the conversion of the thumbnail images into control tiles.

Figure 6:
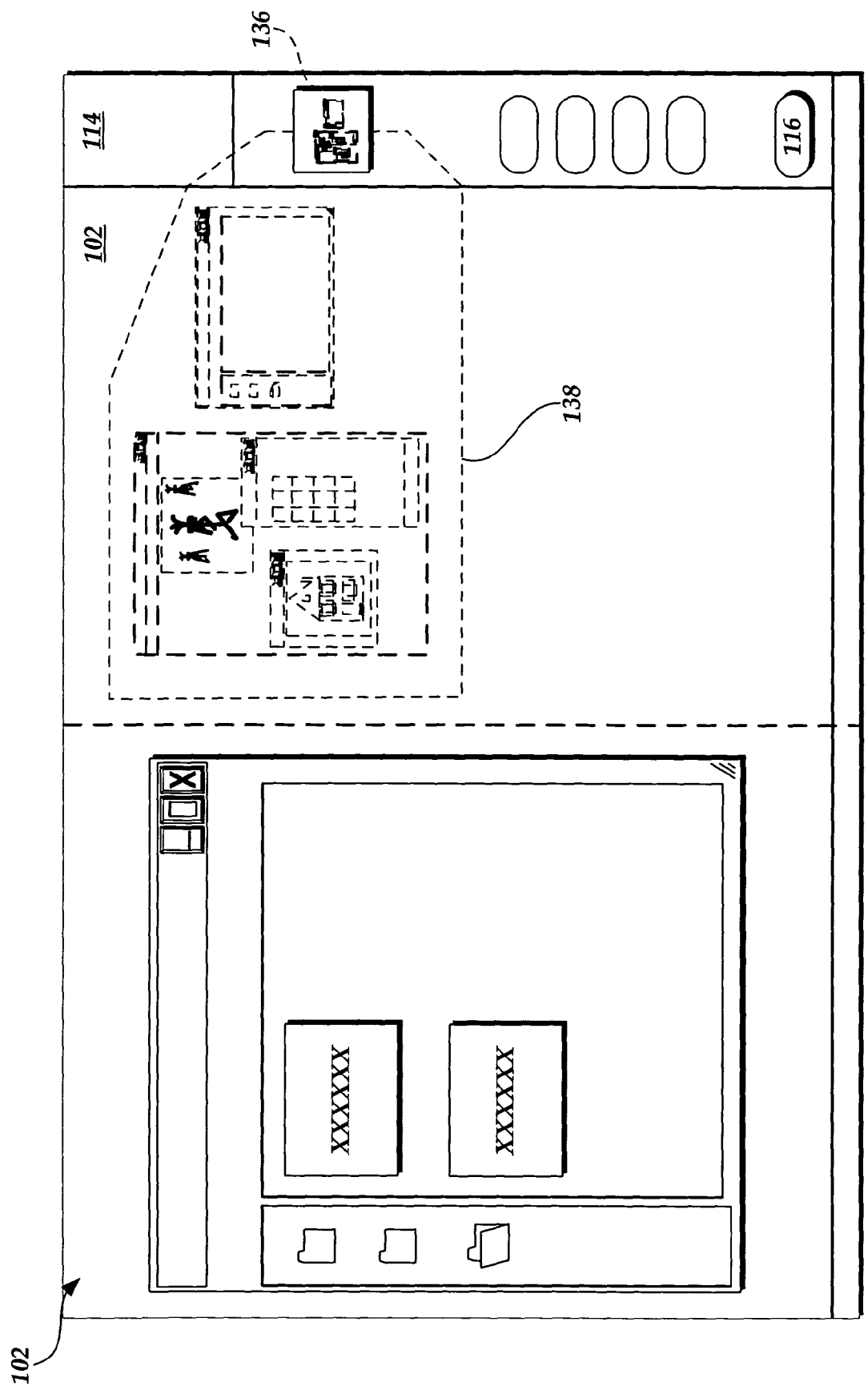
FIG. 6 is a block diagram of the graphical user interface of FIG. 1 illustrating the preview of the display of group projects in accordance with the present invention.

FIG. 6 is a block diagram of a graphical user interface 100 including a thumbnail image 136 of collapsed control group. FIG. 6 also illustrates the projection of a preview 138 of the graphical windows corresponding to the control tiles included within the control tile group. Although FIG. 6 illustrates a reduced size version of the desktop 102 and the location and dimensions of the graphical windows corresponding to the group project 138, the dimensions of the preview can vary and/or a user may be able to manipulate the dimensions of the preview.

In accordance with another aspect of the present invention, control tile groups 126 may be organized into a specific type of group, referred to as a project, that corresponds to organization criteria defined by the operating environment and/or computer users. Generally described, a project group includes one or more control tiles corresponding to instantiated software programs organized according to some organization criteria. A project grouping is a group, such as group 126 (FIGS. 2A-5) and accordingly maintains the functionality described above for groups. As an illustrative example, a project organized as an "accounting" project could include all the programs typically used to accomplish accounting tasks. Accordingly, by utilizing an accounting project, a user can organize and control necessary software applications without having to individually instantiate and manipulate each software application.

The taskbar 114 can include any number of project groups at one time. Further, in an illustrative embodiment of the present invention, the taskbar 114 always includes a "desktop" project group in which control tiles from all the instantiated programs must reside. A particular control tile for a software application may reside in more than one project group without requiring multiple instantiations of the software application. For example, a word processing software application may belong to a desktop project group, a business project group, and a correspondence project group. By associating particular control tiles to a project, users are able to access all the graphic windows associated with customizable functions. In an illustrative embodiment of the present invention, project groups may be saved for subsequent access. Further, project templates may be created that include predefined projects, such as a generic word processing project group, that can be modified by individual users. Further, project groups may be generated by utilizing search capabilities with a network or with the operating environment for all software applications, files or data that satisfy search criteria.

Figure 7:
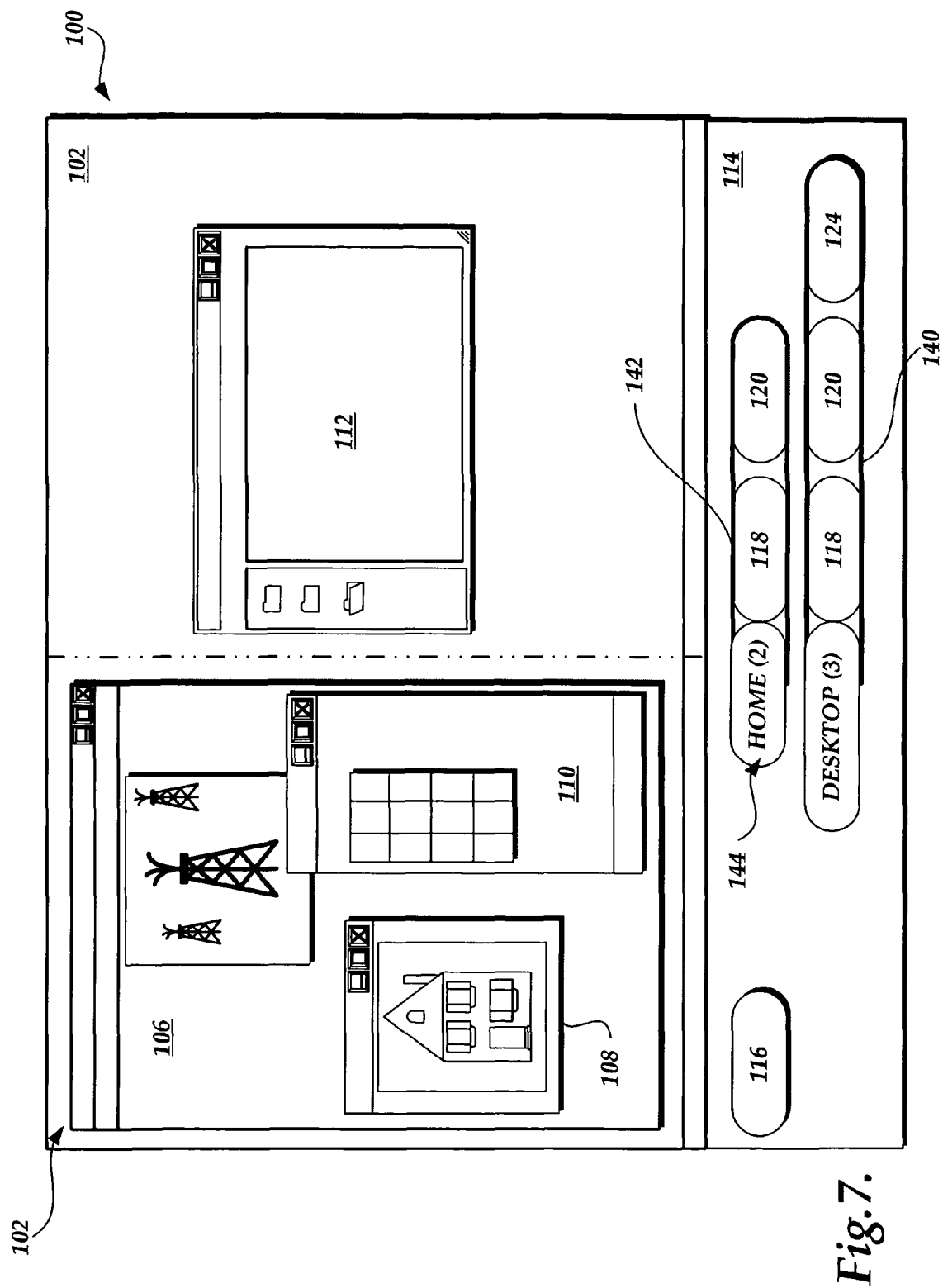
FIG. 7 is a block diagram of the graphical user interface of FIG. 1 illustrating the management of group projects in accordance with the present invention.

FIG. 7 is a block diagram illustrative of a graphical user interface 100 including a base group project 140 including all instantiated programs and a second group project 142 including two control tiles 118 and 120. As described above, the group project 142 includes a group control tile 144 that includes an identifier of the project group. Further, as illustrated in FIG. 7, the group project identifier can include a numerical identifier indicating the number of control tiles current in the group. As described above, although control tiles 118 and 120 are associated with two group projects 140 and 142, the control tiles displayed within each group project refer to the same graphical window. Accordingly, group project tile 144 can be used to minimize and/or restore graphical windows corresponding to control tiles 118 and 120. In the event that individual access is desired, the control tiles 118, 120, and 124 may be still manipulated through the desktop project group 140.

Figure 8:
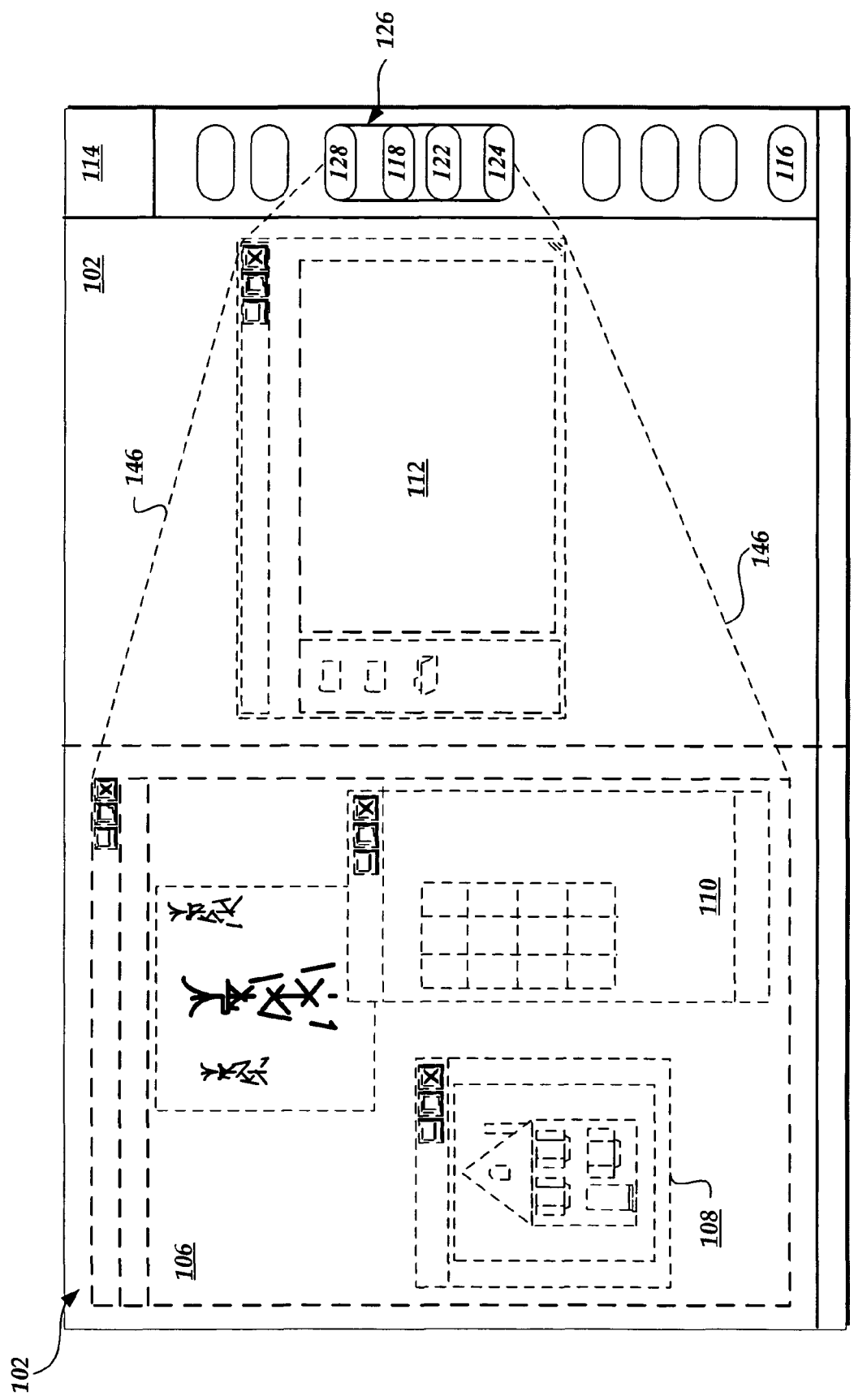
FIG. 8 is a block diagram of the graphical user interface of FIG. 1 illustrating the preview of the display of group projects in accordance with the present invention.

In accordance with a further aspect of the present invention, the operating environment may provide further functionality to preview and restore graphical window group layout. As described above, a minimized group can project a preview of the display of the graphical windows on the desktop. The preview may be used to allow a user to determine whether to select the group and restore the graphical windows on the desktop 102. Although the preview feature was described with relation to a thumbnail image of a collapsed group, the preview is not limited to collapsed groups or thumbnail representations. Additionally, users may be able to manipulate the preview to allow a precise specification of where the graphical windows will be restored. Further, the dimensions or other attributes of graphical windows may be modified by manipulating the preview of the windows. FIG. 8 is a block diagram of the graphical user interface 100 including a group 126 having three control tiles 118, 122, and 124. As illustrated in FIG. 8, a preview of the display of the graphical windows can be projected from the group 126 onto the desktop 102.

Figure 9:
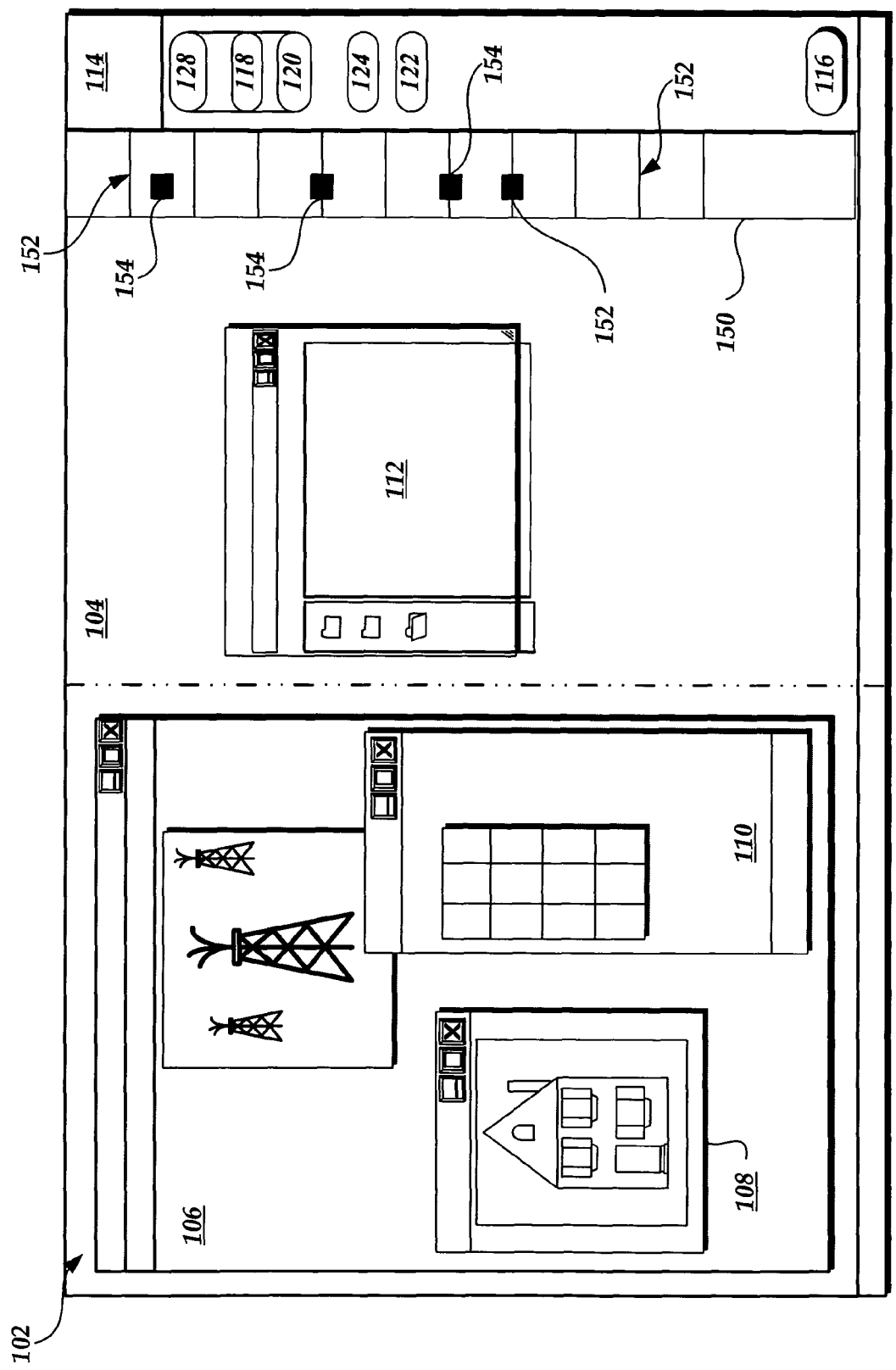
FIG. 9 is a block diagram of the graphical user interface of FIG. 1 illustrating the utilization of group snapshots in accordance with the present invention.

In accordance with another aspect of the present invention, the operating environment can make records, or snapshots, of the layout of the graphical windows within the groups as they are modified over a period of time. The snapshots can be provided as a visual record of the manipulation of the graphical windows. Additionally, the snapshots may be provided as a mechanism to restore the layout of graphical windows. In one embodiment, the snapshots can be presented to users on the graphical user interface 100 according to time. FIG. 9 is a block diagram of a graphical user interface 100 including a timeline 150 for tracking snapshots of groups along various time increments 152. As illustrated in FIG. 9, the timeline 150 includes a number of snapshots 154 that correspond to the saving of the layout of the group at that particular time. Users can select individual snapshots 154 such that operating environment can generate a preview of the group at the particular time such as the previews illustrated in FIGS. 6 and 8. In an illustrative embodiment of the present invention, snapshots may be manually created by users manipulating a snapshot control. Further, snapshots may be automatically created by the operating environment based on time criteria or activity criteria. Further, snapshots may be saved and/or exported for later use.

As an additional embodiment of the present invention, in addition to preserving the layout of the graphical windows, snapshots can also preserve state information corresponding to one or more of the graphical windows. In this embodiment, state information can correspond to values and attributes of the specific files and/or data encompassed within the graphical windows at the time the snapshot is recorded. The state information may be used to restore the particular data/file that was being accessed. Further, the state information can also be used to restore the specific version/value of the data/file that existed at the time the snapshot was created. State information can also include specific user information or other contextual information.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. A method for managing at least two software applications on a display of a computer system comprising:
   instantiating a first software application on the computer system;
   instantiating an other than a first software application on the computer system;
   rendering the first software application in a first graphical window on a first portion of the display and in a first graphic control on a second portion of the display as a result of the instantiation of the first software application;
   rendering the other than the first software application in an other than the first graphical window on the first portion of the display and in an other than the first graphic control on the second portion of the display as a result of the instantiation of the other than the first software application;
   forming a group of software applications in the first graphical window, the group comprising the first software application and the other than the first software application, the forming comprising:
      obtaining an indication to organize the first graphic control and the other than the first graphic control in a group, wherein obtaining the indication includes rendering a set of guides representing inclusion or exclusion from one or more possible groupings in the second portion of the display;
      grouping the first and the other than the first graphic controls on the second portion of the display according to the obtained indication; and
      rendering the grouping in a bordered group in the second portion of the display, the bordered group including the first and the other than the first graphic controls and a graphic group control;
   receiving a single user action to act upon the group; and
   performing, upon the receiving, the single user action to each of the software applications in the group substantially simultaneously without a user applying a sequence of user actions to each of the software applications individually in the group.

2. The method as recited in claim 1, wherein obtaining an indication to organize the first and the other than the first graphic controls includes obtaining a user manipulation of a selection device to drag and drop the first graphic control on the other than the first graphic control.

3. The method as recited in claim 2 further comprising rendering a set of guides indicating one or more possible groupings corresponding to a drag and drop within a selected guide.

4. The method as recited in claim 3, wherein the set of guides include a curved carat indicating the inclusion of a selected graphic control to a group and a straight line to indicate the exclusion of a selected graphic control from a group.

5. The method as recited in claim 1, wherein the graphic group control instantiates a simultaneous action on the first and the other than the first graphic controls and the respective graphical windows corresponding to the graphic controls.

6. The method as recited in claim 5, wherein instantiating an action on the first and the other than the first graphic controls comprises minimizing the graphical windows corresponding to the first and the other than the first graphic controls, restoring the graphical windows corresponding to the first and the other than the first graphic controls, closing the graphical windows corresponding to the first and the other than the first graphic controls, saving data within the graphical windows corresponding to the first and the other than the first graphic controls, or resizing the graphical windows corresponding to the first and the other than the first graphic controls.

7. The method as recited in claim 1, wherein the rendering of the first and the other than the first graphic controls as the bordered group within the second portion of the display includes displaying at least a portion of the first and the other than the first graphic controls, the method further comprising:
   obtaining an indication to collapse the group; and
   rendering the group solely as a group graphic control on the second portion of the display.

8. The method as recited in claim 7, wherein obtaining an indication to collapse the group includes:
   monitoring the frequency of manipulation of the first and the other than the first graphic controls; and
   automatically collapsing the group if the frequency of manipulation is below a threshold level.

9. The method as recited in claim 7, wherein obtaining an indication to collapse the group includes obtaining a user indication to collapse the group.

10. The method as recited in claim 1, wherein rendering the first and the other than the first graphic controls as a group within the second portion of the display includes associating a name with the group and rendering the name on a portion of a group indicator.

11. The method as recited in claim 1 further comprising: obtaining an indication to remove the other than the first graphic control from the group; and rendering the first and the other than the first graphic controls as separate graphic controls.

12. The method as recited in claim 1, wherein rendering the bordered group includes rendering a continuous border around the first and the other than the first graphic controls indicating the association of the first and the other than the first graphic controls to the group.

13. The method as recited in claim 1, wherein the bordered group corresponds to a project and wherein rendering the first and the other than the first graphic controls as a group within the second portion of the display includes rendering a project control for toggling the software applications corresponding to the first and the other than the first graphic controls between a minimized state and a restored state.

14. The method as recited in claim 13, wherein rendering a project control includes rendering a project name and a number of software applications included with the project.

15. The method as recited in claim 13, wherein obtaining an indication to organize the first and the other than the first graphic controls includes obtaining a user manipulation of a selection device to drag and drop the first graphic control on the other than the first graphic control to organize the first and the other than the first graphic controls as a project.

16. The method as recited in claim 13, wherein the computer system includes a base project group separate from the project including the first and the other than the first graphic controls and wherein the first and the other than the first software applications belong to the base project.

17. The method as recited in claim 16 further comprising:
toggling the project corresponding to the first and second software applications in a minimized state;
obtaining an indication to preview the graphical windows corresponding to the minimized project; and
displaying a preview of the display graphical windows corresponding to the first and second software application in the first portion of the display.

18. The method as recited in claim 17, wherein displaying a preview of the display graphical windows corresponding to the first and second software application in the first portion of the display includes displaying a reduced size representation of the graphical windows corresponding to the first and second software application on the first portion of the display.

19. The method as recited in claim 17, wherein displaying a preview of the display graphical windows corresponding to the first and second software application in the first portion of the display includes displaying a full size representation of the graphical windows corresponding to the first and second software application on the first portion of the display.

20. The method as recited in claim 17, wherein displaying a preview of the display graphical windows corresponding to the first and second software application in the first portion of the display includes displaying at least semi-transparent representation of the graphical windows corresponding to the first and second software application on the first portion of the display.

21. The method as recited in claim 17, wherein obtaining an indication to preview the graphical windows corresponding to the minimized project includes obtaining a manipulation of a user selection device to hover over a minimized project control.

22. The method as recited in claim 17, wherein obtaining an indication to preview the graphical windows corresponding to the minimized project includes obtaining a selection of a preview control corresponding to a minimized project control.

23. The method as recited in claim 13 further comprising:
generating a time-line associated with the project corresponding to the first and second software application;
generating at least one snapshot of the first and second graphical window corresponding to the first and second software application, wherein the at least one snapshot is dependent on a time value; and
displaying the snapshot on the time-line as a time-based icon.

24. The method as recited in claim 23, wherein the time-line is associated only with the project corresponding to the first and second software application.

25. The method as recited in claim 23, wherein storing at least one snapshot includes generating a snapshot according to pre-determined time criteria.

26. The method as recited in claim 23, wherein storing at least one snapshot includes:
obtaining an indication to generate a snapshot of the first and second graphical window corresponding to the first and second software application; and
generating a snapshot of the first and second graphical window corresponding to the first and second software application in accordance with the indication.

27. The method as recited in claim 23 further comprising:
obtaining a selection of the time-based icon; and
generating a preview of the display graphical windows corresponding to the first and second software application in the first portion of the display.

28. The method as recited in claim 27 further comprising:
obtaining a subsequent selection of the time-based icon;
recalling the display of the graphical windows corresponding to the first and second software application in the first portion of the display stored according to the time-based icon; and
restoring the display of the graphical windows corresponding to the first and second software application in the first portion of the display stored according to the time-based icon.

29. The method as recited in claim 28, wherein generating at least one snapshot of the first and second graphical window corresponding to the first and second software application according to a time as a time-based icon includes storing state information corresponding to the first and second software application and wherein restoring the display of the graphical windows corresponding to the first and second software application in the first portion of the display stored according to the time-based icon includes restoring state information stored for the first and second software application.

30. The method as recited in claim 1 further comprising:
generating a record of the layout of the first and second graphical window corresponding to the first and second software applications;
storing the record of the layout of the first and second graphical window corresponding to the first and second software applications; and
generating a preview of the display graphical windows corresponding to the first and second software application in the first portion of the display.

31. The method as recited in claim 30, wherein displaying a preview of the display graphical windows corresponding to the first and second software application in the first portion of the display includes displaying a reduced size representation of the graphical windows corresponding to the first and second software application on the first portion of the display.

32. The method as recited in claim 30, wherein displaying a preview of the display graphical windows corresponding to the first and second software application in the first portion of the display includes displaying a full size representation of the graphical windows corresponding to the first and second software application on the first portion of the display.

33. The method as recited in claim 30, wherein displaying a preview of the display graphical windows corresponding to the first and second software application in the first portion of the display includes displaying at least semi-transparent representation of the graphical windows corresponding to the first and second software application on the first portion of the display.

34. The method as recited in claim 30, wherein obtaining an indication to preview the graphical windows includes obtaining a manipulation of a user selection device to hover over the group corresponding to the first and second software applications.

35. The method as recited in claim 30, wherein obtaining an indication to preview the graphical windows includes obtaining a selection of a preview control associated with the group corresponding to the first and second software applications.

36. The method as recited in claim 30 further comprising:
obtaining an indication to restore the graphical windows corresponding to the first and second software applications; and
restoring the display of the graphical windows corresponding to the first and second software application in the first portion of the display stored according to the record of the layout.

37. The method as recited in claim 36, wherein generating a record of the layout of the first and second graphical window corresponding to the first and second software applications includes storing state information corresponding to the first and second software application and wherein restoring the display of the graphical windows corresponding to the first and second software application in the first portion of the display includes restoring state information stored for the first and second software application.

38. The method as recited in claim 1, wherein the second portion of the display corresponds to a taskbar.

39. The method as recited in claim 38, wherein the second portion corresponds to multiple toolbars.

40. A computer storage media having computer-executable instructions for performing the method recited in claim 1.

41. A computer storage media having computer-executable instructions for performing the method recited in claim 13.

42. A computer storage media having computer-executable instructions for performing the method recited in claim 30.

43. A computer system having a processor, a memory and an operating environment, the computer system for performing the method recited in claim 1.

44. A computer system having a processor, a memory and an operating environment, the computer system for performing the method recited in claim 13.

45. A computer system having a processor, a memory and an operating environment, the computer system for performing the method recited in claim 30.

46. A computer system including a display comprising:
a plurality of software applications instantiated and executed in the computer system, each one of the plurality of software applications displaying one or more corresponding graphical windows and displaying a control tile representing each one of the plurality of instantiated and executed software applications;
a desktop for displaying a plurality of graphical windows corresponding to the plurality of software applications on the display;
a taskbar for displaying a plurality of control tiles corresponding to the plurality of software applications on the display;
an organization component for grouping a portion of the plurality of software applications into a group of software applications by organizing the corresponding plurality of control tiles in the taskbar a corresponding group of control tiles;
a rendering component for displaying the corresponding group of control tiles in the taskbar;
a user input component for receiving a user action upon the corresponding group of control tiles in the taskbar; and
an execution component for performing the user action to each software application in the group of software applications substantially simultaneously without a user applying a sequence of user actions to each software application individually in the group of software applications.

47. The system as recited in claim 46, wherein the user input component receives a user manipulation of a selection device to drag and drop a first control tile adjacent to a second control tile.

48. The system as recited in claim 46, wherein the display of the system displays a set of guides indicating one or more possible groupings of control tiles corresponding to a drag and drop on a selected guide.

49. The system as recited in claim 48, wherein the set of guides include a curved carat indicating the inclusion of a selected control tile to a group and a straight line to indicate the exclusion of a selected control tile from a group.

50. The system as recited in claim 46, wherein the corresponding group of control tiles includes a group control.

51. The system as recited in claim 46 wherein the user action comprises one or more of minimizing the graphical windows corresponding to the plurality of control tiles, restoring the graphical windows corresponding to the plurality of control tiles, closing the graphical windows corresponding to the plurality of control tiles, saving data within the graphical windows corresponding to the plurality of control tiles, or resizing the graphical windows corresponding to the plurality of control tiles.

52. The system as recited in claim 46, wherein the displaying the plurality of control tiles as the group within the taskbar portion of the display includes displaying at least a portion of the plurality of control tiles, the system further comprising:
the organization component obtaining an indication to collapse the group; and the rendering component displaying the group solely as a group control tile.

53. The system as recited in claim 46, wherein displaying the plurality of control tiles as the group within the taskbar portion of the display includes associating a name with the group and displaying the name on a portion of a group indicator.

54. The system as recited in claim 46 further comprising:
the organization component obtaining an indication to remove plurality of tiles from the group; and
the rendering component displaying the plurality of control tiles removed from the group as separate control tiles.

55. The system as recited in claim 46, wherein displaying the plurality of control tiles as the group within the taskbar portion of the display includes displaying a continuous border around a first and a second control tile indicating the association of the first and second control tiles to the group.

56. The system as recited in claim 55, wherein displaying a continuous border around the plurality of control tiles indicating the association of the plurality of control tiles to the group includes displaying the continuous border in a color separate from a color corresponding to the taskbar.

57. The system as recited in claim 56 wherein displaying a continuous border around the plurality of control tiles indicating the association of the plurality of control tiles to the group includes displaying the continuous border in a color separate from any other color of a group on the taskbar.

58. The system as recited in claim 46, wherein the group corresponds to a project and wherein displaying the plurality of control tiles as a group within the taskbar portion of the display includes displaying a project control for toggling the software applications corresponding to the plurality of control tiles between a minimized state and a restored state.

59. The system as recited in claim 58, wherein displaying a project control includes displaying a project name and a number of software applications included with the project.

60. The system as recited in claim 58, wherein the computer system includes a base project separate from the project including the plurality of control tiles and wherein the plurality of software applications belong to the base project.

61. The method as recited in claim 59 further comprising:
toggling the project corresponding to the first and second software applications in a minimized state;
obtaining an indication to preview the graphical windows corresponding to the minimized project; and
displaying a preview of the display graphical windows corresponding to the first and second software application in the desktop portion of the display.

62. The method as recited in claim 59, wherein displaying a preview of the display graphical windows corresponding to the first and second software application in the desktop portion of the display includes displaying a reduced size representation of the graphical windows corresponding to the first and second software application on the desktop portion of the display.

63. The method as recited in claim 59, wherein displaying a preview of the display graphical windows corresponding to the first and second software application in the desktop portion of the display includes displaying a full size representation of the graphical windows corresponding to the first and second software application on the desktop portion of the display.

64. The method as recited in claim 60, wherein displaying a preview of the display graphical windows corresponding to the first and second software application in the desktop portion of the display includes displaying at least semi-transparent representation of the graphical windows corresponding to the first and second software application on the desktop portion of the display.

65. The method as recited in claim 61, wherein obtaining an indication to preview the graphical windows corresponding to the minimized project includes obtaining a manipulation of a user selection device to hover over a minimized project control.

66. The method as recited in claim 61, wherein obtaining an indication to preview the graphical windows corresponding to the minimized project includes obtaining a selection of a preview control corresponding to a minimized project control.

67. The method as recited in claim 58 further comprising:
generating a time-line associated with the project corresponding to the first and second software application;
generating at least one snapshot of the first and second graphical window corresponding to the first and second software application, wherein the at least one snapshot is dependent on a time value; and
displaying the snapshot on the time-line as a time-based icon.

68. The method as recited in claim 67 further comprising:
obtaining a selection of the time-based icon; and
generating a preview of the display graphical windows corresponding to the first and second software application in the desktop portion of the display.

69. The method as recited in claim 68 further comprising:
obtaining a subsequent selection of the time-based icon;
recalling the display of the graphical windows corresponding to the first and second software application in the desktop portion of the display stored according to the time-based icon; and
restoring the display of the graphical windows corresponding to the first and second software application in the desktop portion of the display stored according to the time-based icon.

70. The method as recited in claim 69, wherein generating at least one snapshot of the first and second graphical window corresponding to the first and second software application according to a time as a time-based icon includes storing state information corresponding to the first and second software application and wherein restoring the display of the graphical windows corresponding to the first and second software application in the desktop portion of the display stored according to the time-based icon includes restoring state information stored for the first and second software application.

71. The method as recited in claim 46 further comprising:
generating a record of the layout of the first and second graphical window corresponding to the first and second software applications;
storing the record of the layout of the first and second graphical window corresponding to the first and second software applications; and
generating a preview of the display graphical windows corresponding to the first and second software application in the desktop portion of the display.

72. The method as recited in claim 71, wherein displaying a preview of the display graphical windows corresponding to the first and second software application in the desktop portion of the display includes displaying a reduced size representation of the graphical windows corresponding to the first and second software application on the desktop portion of the display.

73. The method as recited in claim 71, wherein displaying a preview of the display graphical windows corresponding to the first and second software application in the desktop portion of the display includes displaying a full size representation of the graphical windows corresponding to the first and second software application on the desktop portion of the display.

74. The method as recited in claim 71, wherein displaying a preview of the display graphical windows corresponding to the first and second software application in the desktop portion of the display includes displaying at least semi-transparent representation of the
graphical windows corresponding to the first and second software application on the desktop portion of the display.

75. The method as recited in claim 71, wherein obtaining an indication to preview the graphical windows includes obtaining a manipulation of a user selection device to hover over the group corresponding to the first and second software applications.

76. The method as recited in claim 71, wherein obtaining an indication to preview the graphical windows includes obtaining a selection of a preview control associated with the group corresponding to the first and second software applications.

77. The method as recited in claim 71 further comprising:
obtaining an indication to restore the graphical windows corresponding to the first and second software applications; and
restoring the display of the graphical windows corresponding to the first and second software application in the desktop portion of the display stored according to the record of the layout.

78. The method as recited in claim 77, wherein generating a record of the layout of the first and second graphical window corresponding to the first and second software applications includes storing state information corresponding to the first and second software application and wherein restoring the display of the graphical windows corresponding to the first and second software application in the desktop portion of the display includes restoring state information stored for the first and second software application.

79. A computer storage media having computer-executable instructions for performing the method recited in claim 46.

80. The method as recited in claim 46, wherein the toolbar portion is represented as two or more distinct areas on the display.

81. A computer system for managing a plurality of software applications, the system comprising:
means for displaying two or more software applications as corresponding graphical windows when the two or more software applications are instantiated on the computer system;
means for displaying two or more control tiles corresponding to two or more software applications when the two or more software applications are instantiated on the computer system;
means for forming, based on an action, a software application group comprising the two or more software applications by creating a control tile group comprising the two or more control tiles, each of the control tiles in the control tile group corresponding to one of the software applications in the software application group;
means for automatically, displaying the two or more control tiles in a group; and
means for executing a single user action upon the control tile group, where the act of executing comprises performing the single user action to each of the software applications in the software application group substantially simultaneously without a user applying a sequence of user actions to each of the software applications in the software application group.

82. The system as recited in claim 81, wherein the set of guides include a curved carat indicating the inclusion of a selected control tile to a group and a straight line to indicate the exclusion of a selected control tile from a group.

83. The system as recited in claim 81, wherein the single user action includes:
minimizing the graphical window corresponding to each software application,
restoring the graphical window corresponding to each software application,
closing the graphical window corresponding to each software application,
saving data within the graphical window corresponding to each software application, or
resizing the graphical windows corresponding to each software application.

84. The system as recited in claim 81, wherein the means for displaying the two or more control tiles as a group includes means for displaying a group control without displaying any portion of the two or more control tiles.

85. The system as recited in claim 81, wherein the means for displaying the two or more control tiles as a group includes means for displaying the two or more control tiles as a project for toggling the software applications corresponding to the two or more control tiles between a minimized and a restored state.

86. The system as recited in claim 85 further comprising means for displaying a time-dependent representation of the project.

87. The system as recited in claim 86 further comprising means for restoring a time-dependent representation of the project.

88. The system as recited in claim 81 further comprising means for previewing the layout of the graphical windows corresponding to the two or more software applications on the means for displaying two or more software applications as graphical windows.

89. The system as recited in claim 88 further comprising means for storing state corresponding to the two or more software applications.

90. The system as recited in claim 81 further comprising:
means for obtaining an indication to collapse the two or more control tiles into the group control tile; and
means for displaying the group solely as a group control tile.

91. The system as recited in claim 81 further comprising:
means for obtaining an indication to remove two or more control tiles from the group; and
means for displaying the two or more control tiles removed from the group as separate control tiles.

* * * * *